US008493977B2

(12) United States Patent
Vempati et al.

(10) Patent No.: US 8,493,977 B2
(45) Date of Patent: Jul. 23, 2013

(54) DETECTION OF AN UNAUTHORIZED ACCESS POINT IN A WIRELESS COMMUNICATION NETWORK

(75) Inventors: Ramprasad Vempati, Karnataka (IN); Pasupula Sridhar, Karnataka (IN); Ananda Krishnan Vishwanathan, Karnataka (IN)

(73) Assignee: Symbol Technologies, Inc., Holtsville, NY (US)

( * ) Notice: Subject to any disclaimer, the term of this patent is extended or adjusted under 35 U.S.C. 154(b) by 326 days.

(21) Appl. No.: 12/957,260

(22) Filed: Nov. 30, 2010

(65) Prior Publication Data

US 2012/0134272 A1    May 31, 2012

(51) Int. Cl.
*H04L 12/28* (2006.01)
(52) U.S. Cl.
USPC .................................................. 370/389
(58) Field of Classification Search
USPC ............... 370/338, 349, 328, 389, 310, 312; 455/432.1; 709/223; 726/22, 23, 25
See application file for complete search history.

(56) References Cited

U.S. PATENT DOCUMENTS

| 8,069,483 | B1* | 11/2011 | Matlock ........................ 726/23 |
| 2005/0141498 | A1* | 6/2005 | Cam Winget et al. ........ 370/389 |
| 2005/0213549 | A1* | 9/2005 | Bridge et al. ................ 370/338 |
| 2007/0184832 | A1* | 8/2007 | Faccin et al. ................ 455/432.1 |
| 2007/0286143 | A1* | 12/2007 | Olson et al. ................ 370/338 |
| 2010/0115622 | A1* | 5/2010 | Amoroso et al. ........... 726/25 |
| 2010/0257607 | A1* | 10/2010 | Falola et al. ................ 726/23 |
| 2012/0124665 | A1* | 5/2012 | Dubey et al. ................ 726/22 |

* cited by examiner

*Primary Examiner* — Hassan Kizou
*Assistant Examiner* — Gustavo Lopez-Vargas
(74) *Attorney, Agent, or Firm* — Brian M. Mancini

(57) ABSTRACT

A method and controller for detecting an unauthorized access point in a wireless communication network includes a first step of generating (200) a probe identity that is unused in the wireless communication network. A next step includes informing (202) adopted access points in the communication network of this generated probe identity, and that packets from this generated probe identity should be ignored. A next step includes broadcasting (204) at least one probe request using the generated probe identity. A next step includes detecting (206) if there are any probe responses to the at least one probe request, indicating an unauthorized access point. A next step includes providing an alert (214, 216, 218) if an unauthorized access point is detected.

20 Claims, 2 Drawing Sheets

DETECTION OF AN UNAUTHORIZED ACCESS POINT IN A WIRELESS COMMUNICATION NETWORK

FIELD OF THE DISCLOSURE

The present invention relates generally to wireless communication networks and more particularly to detection of an unauthorized access point in a wireless communication network.

BACKGROUND

A problem that is arising in communication networks, such as a wireless local area network, is the ease with which an unauthorized or unsecure access point can be added to the network. For example, an employee could add an unsecure access point to a corporate network without have authorization to do so. In this case, anyone in proximity to that "rogue" access point could access (i.e. snoop) the corporate network. In another example, a hacker could attempt to add an unsecured access point to a communication network for illicit purposes. Such unauthorized access points pose a security threat to the communication network to which they are attached.

One solution to this problem is for the network operator to use an intrusion detection technique to find unauthorized access points on the network. In effect, this technique use existing access points, mobile devices or controllers in the communication network to scan all available frequencies of that communication network to detect the use of a frequency that has not been authorized. However, the use of this technique reduces the available bandwidth for authorized users of the network, and can actually detect access points on other neighboring networks, which do not pose a threat. Alternatively, an intrusion testing device, such as a separate sensor or detector, can be added to the communication network to check the network frequencies, but this adds costs.

Another solution is for the communication network controller to compare the Media Access Control (MAC) address (or other identity such as a Basic Service Set Identifier, BSSID) of active access points on the communication network against a list of authorized access points stored in the controller. Any access points that do not have an identity that matches the list of authorized access points are then located to confirm their security status. However, this technique requires that the list be maintained at all times, which is a logistical problem.

Accordingly, there is a need for a technique to detect an unauthorized or rogue access point that is attached to a wireless communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
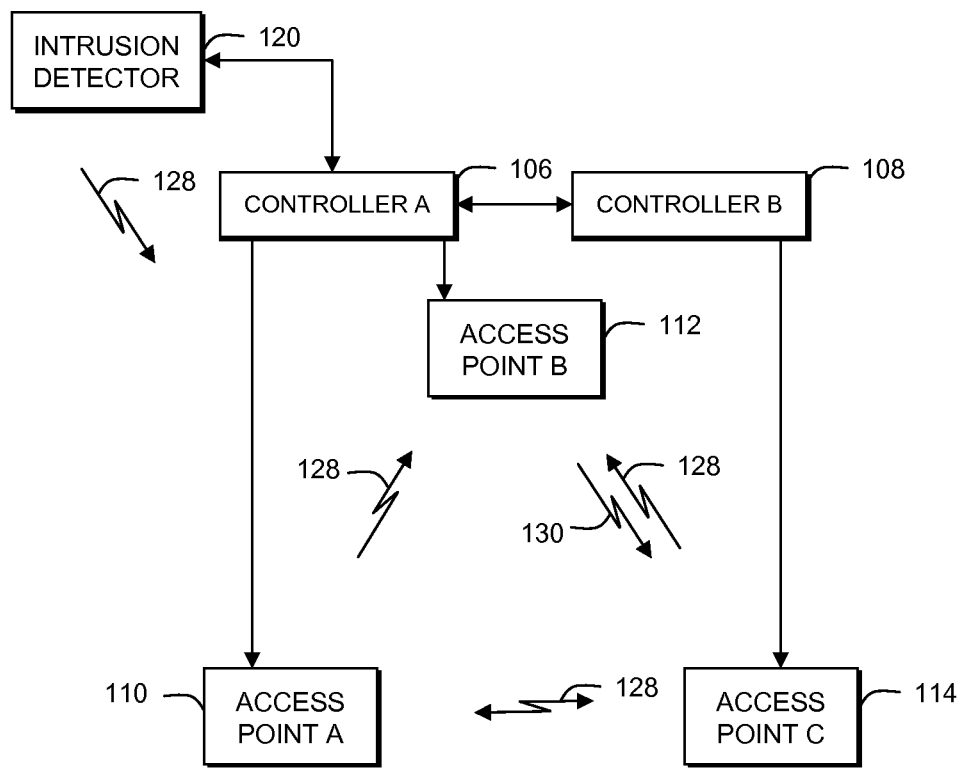
FIG. 1 is a simplified block diagram of a system, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus and method is described that enables the detection of an unauthorized or rogue access point that is attached to a wireless communication network. In particular, the present invention probes the wireless medium of the communication network with a source identity generated by a controller and detects unauthorized or rogue access points based on replies received. The present invention does not require any network entities such as the controller, access points, or mobile devices to move out of their own channel to detect unauthorized frequency use, and therefore does not impact the available bandwidth of the network. In addition, the present invention does not require the deployment of a separate intrusion detector or sensor to find unauthorized access points.

FIG. 1 is a block diagram depiction of a system in accordance with the present invention. A plurality of network entities are shown, which can support a wireless communication network, such as a wireless local area network (WLAN) for example. The network entities can include a controller cluster 106, 108 and one or more wireless access points 110, 112, 114, connected in wired and/or wireless configurations. Each controller in the cluster can control one or more access point. Access terminals can be present or mobile devices 122, 124, 126 can roam within the network, while the controllers control communications with the terminals or mobile devices through the access points. The protocols and messaging needed to establish a communication network are known in the art and will not be presented here for the sake of brevity.

The wireless communication network can include local and wide-area networks, or other IEEE 802.11 wireless communication systems. However, it should be recognized that the present invention is also applicable to other wireless communication systems modified to implement embodiments of the present invention.

Referring back to FIG. 1, there is shown a block diagram of various entities adapted to support the inventive concepts of the embodiments of the present invention. Those skilled in the art will recognize that FIG. 1 does not depict all of the equipment necessary for network to operate but only those network components and logical entities particularly relevant to the description of embodiments herein. For example, controllers, access points, and mobile devices can all includes separate processors, communication interfaces, transceivers, memories, etc. In general, components such as processors, memories, and interfaces are well-known. For example, processing units are known to comprise basic components such as, but not limited to, microprocessors, microcontrollers, memory cache, application-specific integrated circuits (ASICs), and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the memory and control aspects of the present invention may be implemented in any of the devices listed above or distributed across such components. It is within the contemplation of the invention that the operating requirements of the present invention can be implemented in software, firmware or hardware, with the function being implemented in a software processor (or a digital signal processor) being merely an option.

Referring back to FIG. 1, a controller 106 is provided for detecting an unauthorized access point in a wireless communication network under its control, in accordance with the present invention. A master controller A 106 generates a probe identity that is unused in the wireless communication network. The identity can be an unused MAC address (e.g. "aa:bb:cc:dd:ee:ff"), an unused BSSID, and the like. An unused identity can be any identity that has not been seen in use in the network by the controller 106, or can be an interface MAC address, which are known by the controller as not being authorized for use by access points 110, 112, 114 of the network.

The master controller A 106 informs its own adopted (authorized and secured) access points 110 in the communication network, and informs other controllers (B 108) in the cluster to inform their adopted access points 114, of this generated probe identity, and provides directions that packets from this generated probe identity should be ignored by all the adopted access points, including a probe request. The information from the controller A 106 can also include a time duration for which this generated probe identity will be valid.

The controller also directs all the adopted access points 110 to broadcast at least one probe request 128 using the generated probe identity on their own respective operating channel in the communication network. If intrusion sensor/detectors 120 are being used in the network, these detectors will also broadcast the probe request(s) 128, but on all communication network channels. Any devices in the communication network operating on one of these channels will get the probe request. Preferably, two different types of probe requests are broadcast. A first probe request will be broadcast with a Service Set Identifier (SSID) set as NULL. A second probe request can also be broadcast with specific SSID's that are configured by the controller 106 on adopted access ports. None of the access ports 110, 114 adopted to the controllers 106, 108 are supposed to respond to either probe request, i.e. null SSID probe request or specific SSID probe request.

Typically, when a probe request is sent with a NULL SSID, all the access points will respond with their configured SSIDs (if the access points were not configured with the "do not respond to NULL SSID" directions in accordance with the present invention). If the probe request 128 is sent with a specific SSID, only the access points that are configured with the same SSID on them will respond with a probe response. However, only unauthorized access points would respond either to one of the probe requests or both (depending on the implementation) as these unauthorized access points would think that the probe requests come from a potential mobile device that might want to associate to the unauthorized access point.

The access points 110, 114 will detect if there are any probe responses 130 to the at least one probe request, which would necessarily come from an unauthorized access point 112. Specifically, all the adopted access points 110, 114 will sniff the communication medium on their respective channels of operation and forward any probe responses to the controllers 106, 108. If there are no probe responses, then no unauthorized access points have been detected, and the controllers 106, 108 can wait for the next configured time interval to recheck to see if any unauthorized access points have been added to the communication network using a newly generated probe identity (newly generated for added security). However, if there are any probe responses (e.g. such as response 130 from unauthorized access point B 112 in response to probe request 128 from access point A 110 for example, this indicates that there is an unauthorized access point in the communication network, and an alert can be provided by the master controller A 106 for an administrator. However, the present invention can also further determine what kind of unauthorized access point is present.

In particular, the master controller 106 can check whether the probe response 130 has a known MAC address, i.e. a MAC address of a listed BSSID of an adopted access point in the communication network. In this case it would then be known that the unauthorized access point (B 112) is spoofing a valid MAC address of an adopted access point (e.g. A or C 110, 114) in order to avoid detection, and an alert can be provided to the administrator. However, if the probe response 130 has an unknown MAC address then it could be from either a rogue or an unauthorized access point, and a further test can be performed.

The controller 106 can then check whether the probe response 130 has a known SSID (i.e. an SSID that is configured on any of the controllers of the cluster in the communication network). If the probe response 130 has a known SSID, then this access point (C 114) may have been improperly or unsecurely configured by a network user and this access point is categorized as a rogue access point, and an alert can be provided for this rogue access point to the administrator. If the probe response 130 has an unknown SSID, then this access point is categorized simply as an unauthorized access point, and an alert can be provided for this access point to the administrator. Optionally, in this case other rogue access point detection logic can be used to determine whether this access point is actually a rogue access point or not.

The above alerts can be provided to the administrator through Simple Network Management Protocol (SNMP) traps or may use in-built or third-party location applications that locate and eliminate unauthorized access points.

Figure 2:
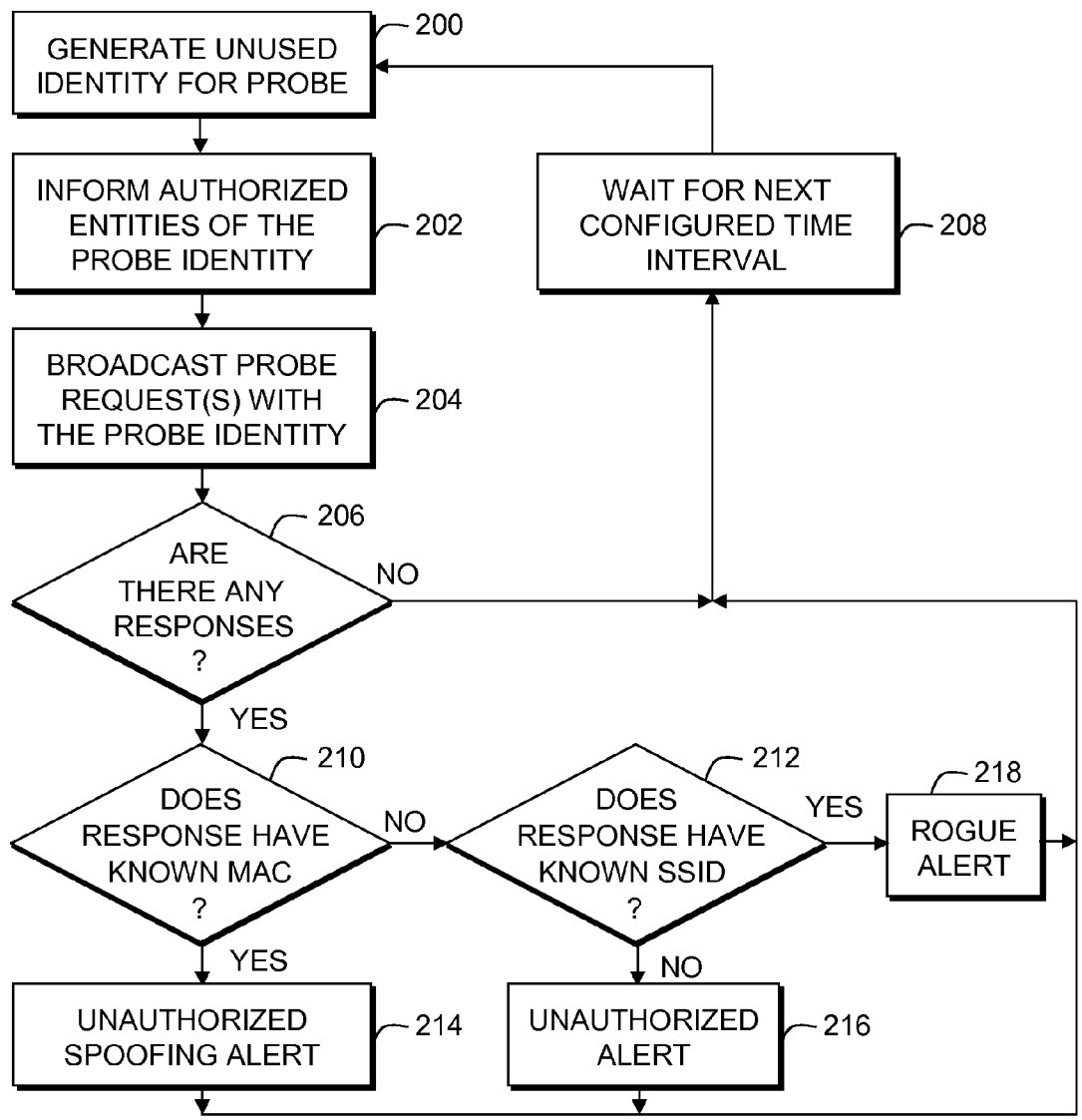
FIG. 2 is a flowchart of a method, in accordance with some embodiments of the present invention.

FIG. 2 illustrates a flowchart of a method for detecting an unauthorized access point in a wireless communication network, in accordance with the present invention. The method includes generating 200 a probe identity that is unused in the wireless communication network. The identity can be an unused MAC address (e.g. "aa:bb:cc:dd:ee:ff"), an unused BSSID, and the like. An unused identity can be any identity that has not been seen in use in the network by the controllers, or can be an interface MAC address, which are known by the master controller as not being authorized for use by access points of the network.

A next step includes informing 202 the adopted (authorized) access points in the communication network of this generated probe identity, and that packets from this generated probe identity should be ignored, including a probe request.

In practice, the master controller will inform all of the other controllers in the cluster in the communication network of the generated probe identity. Each controller will in turn inform all of its adopted (i.e. authorized and secured) access points of this generated probe identity, directing that any packet from this generated probe identity should just be ignored, including a probe request. Informing 302 can also include a time duration for which this generated probe identity will be valid.

A next step includes all the authorized access points broadcasting 204 at least one probe request using the generated probe identity on their own respective operating channel in the communication network. If intrusion sensor/detectors are being used in the network, these detectors will also broadcast the probe request(s), but on all communication network channels. Preferably, two different types of probe requests are broadcast. A first probe request will be broadcast with a Service Set Identifier (SSID) set as NULL. A second probe request can also be broadcast with specific SSID's that are configured by the master controller on adopted access ports. None of the access ports adopted to the controllers are supposed to respond to either probe request, i.e. null SSID probe request or specific SSID probe request.

A next step includes detecting 206 if there are any probe responses to the at least one probe request, which would necessarily come from unauthorized access points. Specifically, all the adopted access points will sniff the communication medium on their respective channels of operation and forward any probe responses to the master controller. If there are no probe responses, then no unauthorized access points have been detected, and the controllers can wait 208 for the next configured time interval to recheck to see if any unauthorized access points have been added to the communication network using a newly generated probe identity (step 200). However, if there are any probe responses, this indicates that there are unauthorized access points in the communication network, and an alert can be provided 214, 216, 218. However, the present invention can also further determine what kind of unauthorized access point is present.

In particular, the master controller can check 210 whether the probe response has a known MAC address, i.e. a MAC address of a listed BSSID of an adopted access point in the communication network. In this case it would then be known that the unauthorized access point is spoofing a valid MAC address of an adopted access point in order to avoid detection, and an alert 214 can be provided to an administrator. However, if the probe response has an unknown MAC address then it could be from either a rogue or unauthorized access point, and a further test can be performed.

The master controller can then check 212 whether the probe response has a known SSID (i.e. an SSID that is configured on any of the controllers of the cluster in the communication network). If the probe response has a known SSID, then this access point may have been improperly or unsecurely configured by a network user and this access point is categorized as a rogue access point, and an alert 218 can be provided for this rogue access point to an administrator. If the probe response has an unknown SSID, then this access point is categorized simply as an unauthorized access point, and an alert 216 can be provided for this access point to an administrator. Optionally, in this case other rogue access point detection logic can be used to determine whether this access point is actually a rogue access point or not.

Any of the above alerts 214, 216, 218 are followed by repeating the above steps for every configure interval 208. The above alerts can be provided to the administrator through Simple Network Management Protocol (SNMP) traps or may use in-built or third-party location applications that locate and eliminate unauthorized access points.

Advantageously, the apparatus and method described herein enables the detection of an unauthorized or rogue access point that is attached to a wireless communication network. The present invention does not require any network entities such as the controller, access points, or mobile devices to move out of their own channel to detect unauthorized frequency use, and therefore does not impact the available bandwidth of the network. In addition, the present invention does not require the deployment of a separate intrusion detector or sensor to find unauthorized access points.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for detecting an unauthorized access point in a wireless communication network, the method comprising:
   generating, by a processor, a probe identity that is unused in the wireless communication network;
   informing, by the processor, adopted access points in the communication network of this generated probe identity, and that packets from this generated probe identity should be ignored;
   broadcasting, by the adopted access points, at least one probe request using the generated probe identity;
   detecting, by the processor, if there are any probe responses to the at least one probe request, indicating an unauthorized access point; and
   providing an alert, by the processor, if an unauthorized access point is detected.

2. The method of claim 1, wherein informing includes a time duration for which the generated probe identity will be valid.

3. The method of claim 1, wherein broadcasting is performed by all adopted access points on their own respective operating channel in the communication network.

4. The method of claim 3, wherein broadcasting includes a separate intrusion detector also broadcasting the at least one probe request on all communication network channels.

5. The method of claim 1, wherein informing includes informing the adopted access points in the communication network that packets from a probe request with a Service Set Identifier (SSID) set as NULL should be ignored, and wherein broadcasting includes broadcasting a probe request with the SSID set as NULL, whereupon the adopted access points in the communication network ignore the probe request.

6. The method of claim 1, wherein informing includes informing the adopted access points in the communication network that packets from a probe request with specific Service Set Identifiers (SSIDs) configured on the adopted access ports should be ignored, and wherein broadcasting includes broadcasting a probe request with one of the specific SSIDs that are configured on adopted access ports, whereupon the adopted access points in the communication network ignore the probe request.

7. The method of claim 1, wherein informing includes informing the adopted access points in the communication network that packets from a probe request with a Service Set Identifier (SSID) set as NULL and specific Service Set Identifiers (SSIDs) configured on the adopted access ports should be ignored, and wherein broadcasting includes broadcasting a first probe request with the SSID set as NULL and a second probe request with one of the specific SSIDs that are configured on adopted access ports, whereupon the adopted access points in the communication network ignore the probe requests.

8. The method of claim 1, further comprising:
   checking whether the probe response has a known MAC address, and
   providing an alert of unauthorized spoofing of an access point.

9. The method of claim 1, further comprising:
   checking whether the probe response has a known SSID, and
   providing an alert of an unauthorized access point if the probe response has an unknown SSID, and
   providing an alert of a rogue access point if the probe response has a known SSID.

10. A controller for detecting an unauthorized access point in a wireless communication network, the controller comprising:
    a processor operable to generate a probe identity that is unused in the wireless communication network, inform adopted access points in the communication network of this generated probe identity, and that packets from this generated probe identity should be ignored, direct the adopted access points to broadcast at least one probe request using the generated probe identity, detect if there are any probe responses to the at least one probe request, indicating an unauthorized access point, and provide an alert if an unauthorized access point is detected.

11. The controller of claim 10, wherein the processor will inform the adopted access points of a time duration for which the generated probe identity will be valid.

12. The controller of claim 10, wherein the generated probe identity is an interface MAC address known by the controller as not being authorized for use by access points.

13. The controller of claim 12, further comprising a separate intrusion detector also directed by the processor to broadcast the at least one probe request on all communication network channels.

14. The controller of claim 10, wherein adopted access points in the communication network are informed that packets from a probe request with a Service Set Identifier (SSID) set as NULL should be ignored, and wherein a first probe request includes the SSID set as NULL, whereupon the adopted access points in the communication network ignore the probe request.

15. The controller of claim 10, wherein the adopted access points in the communication network are informed that packets from a probe request with specific Service Set Identifiers (SSIDs) configured on the adopted access ports should be ignored, and wherein a second probe request includes one of the specific SSIDs that are configured on the adopted access ports, whereupon the adopted access points in the communication network ignore the probe request.

16. The controller of claim 10, wherein the adopted access points in the communication network are informed that packets from a probe request with a Service Set Identifier (SSID) set as NULL and specific Service Set Identifiers (SSIDs) configured on the adopted access ports should be ignored, and wherein the at least one probe request includes a first probe request with a the SSID set as NULL and a second probe request with one of the specific SSIDs that are configured on adopted access ports,
whereupon the adopted access points in the communication network ignore the probe requests.

17. The controller of claim 10, wherein the processor is further operable to check whether the probe response has a known MAC address, and provide an alert of unauthorized spoofing of an access point.

18. The controller of claim 10, wherein the processor is further operable to check whether the probe response has a known SSID, and provide an alert of an unauthorized access point if the probe response has an unknown SSID, and provide an alert of a rogue access point if the probe response has a known SSID.

19. A controller for detecting an unauthorized access point in a wireless communication network, the controller comprising:

a processor operable to generate a probe identity that is unused in the wireless communication network, inform adopted access points in the communication network of this generated probe identity and that packets from a probe request with a Service Set Identifier (SSID) set as NULL and specific Service Set Identifiers (SSIDs) configured on the adopted access ports should be ignored, and that packets from this generated probe identity, probe requests with the SSID set as NULL, and probe requests with one of the specific SSIDs that are configured on adopted access ports should be ignored, direct the adopted access points to broadcast a first probe request using the generated probe identity and that includes the SSID set as NULL and a second probe request using the generated probe identity and that includes one of the specific SSIDs that are configured on the adopted access ports, whereupon the adopted access points in the communication network ignore the probe requests, detect if there are any probe responses to the at least one probe request, indicating an unauthorized access point, and provide an alert if an unauthorized access point is detected.

20. The controller of claim 10, wherein the processor is further operable to check whether the probe response has a known MAC address, and provide an alert of unauthorized spoofing of an access point, check whether the probe response has a known SSID, and provide an alert of an unauthorized access point if the probe response has an unknown SSID, and provide an alert of a rogue access point if the probe response has a known SSID.

* * * * *